United States Patent
Su

(10) Patent No.: US 6,612,337 B2
(45) Date of Patent: Sep. 2, 2003

(54) ROTARY VALVE

(76) Inventor: Huo-Chen Su, No 452, Dong Keng Rd., Dong Shi Chen, Taichung Hsien (TW)

( * ) Notice: Subject to any disclaimer, the term of this patent is extended or adjusted under 35 U.S.C. 154(b) by 57 days.

(21) Appl. No.: 10/052,516

(22) Filed: Jan. 23, 2002

(65) Prior Publication Data

US 2003/0136450 A1 Jul. 24, 2003

(51) Int. Cl.⁷ .............................................. F16K 11/076
(52) U.S. Cl. .............................. 137/625.47; 137/625.19
(58) Field of Search ....................... 137/625.19, 625.47, 137/614.01

(56) References Cited

U.S. PATENT DOCUMENTS

| | | | | |
|---|---|---|---|---|
| 2,397,576 A | * | 4/1946 | Townhill | 137/614.01 |
| 3,554,224 A | * | 1/1971 | Kirk et al. | 137/625.19 |
| 3,773,076 A | * | 11/1973 | Smith | 137/625.19 |
| 3,937,252 A | * | 2/1976 | Ishida | 137/625.47 |
| 4,968,334 A | * | 11/1990 | Hilton | 96/124 |
| 5,529,758 A | * | 6/1996 | Houston | 137/312 |

* cited by examiner

Primary Examiner—John Fox
(74) Attorney, Agent, or Firm—Rosenberg, Klein & Lee

(57) ABSTRACT

A rotary valve includes a valve seat containing a circular valve block comprising two abutted semicircular blocks and a space inside the valve seat; an axial plunger each at the centers of the upper and the lower sides of the semicircular blocks; an air inlet and outlet passage each formed within each semicircular block extending from periphery to the axial plunger; a trough in the periphery of each semicircular block; and a hole connecting the periphery of the valve seat and its interior; power from a linkage mechanism being introduced to drive the circular valve block to rotate so that a specific timing being given to air circulation through the passages and the hole during the travel, of rotation executed by the two semicircular blocks to change connection configuration of the passages to control air inlet and exhaustion.

1 Claim, 5 Drawing Sheets

ROTARY VALVE

BACKGROUND OF THE INVENTION (a) Field of the Invention

The present invention is related to a rotary valve, and more particularly, to one that is provided with an air inlet and an air outlet passages and allows the connecting configuration of the passage be changed by a rotary valve block.

(b) Description of the Prior Art

Usually, pneumatic or hydraulic system is required in a mechanical operation mechanism or control system to transmit power or linkage signals. In the passage of such pneumatic or hydraulic system, valves are required. As there are too many types of valves available depending on the nature of machine, the present invention is related only to the valve adapted to an air filtration equipment such as an oxygen generator. For such an oxygen generator, an air compressor motor is used to drive an air pumping structure to fetch the air from the atmosphere. The air is then directed into an oxygen filtration unit to fit out oxygen, which is essentially used for medical purpose, or any other place or equipment that requires the consumption of oxygen. However, a solenoid is used in the passage of said oxygen filtration unit to control the timing of air inlet and release through the filtration unit while the timing to activate the solenoid is controlled by a separately provided circuit. Therefore, the adaptation of the circuit for the solenoid makes the oxygen generator move complicate and the solenoid is an expensive item to make production cost relatively higher. More precision circuit design depending on the electronic control in turn attracts higher failure frequency making the service life of the circuit shorter.

SUMMARY OF THE INVENTION

The primary purpose of the present invention is to provide a rotary valve with an air inlet and an air outlet passages for the same valve block and the connecting configuration of the common passage can be changed to control air inlet and exhaust. To achieve the purpose, the body of the valve includes a valve seat containing a rotary circular valve comprised two abutted semicircular blocks. Wherein, an accommodation space is provided in the valve seat. An axial plunger is provided each respectively in the upper and the lower sides of the semicircular valve blocks. Inside the two semicircular blocks, an air inlet and outlet passage is respectively formed extending from the periphery to the axial plunger, and a trough in a proper arc length is provided on the periphery in relation to the opening of the passage. A hole is provided on the periphery of the valve seat penetrating into the valve to connect the troughs and the passages. A linkage mechanism is provided to introduce the power to rotate the circular valve block so that during the rotation trip of the two semicircular blocks, a specific timing is provided for the troughs in relation to the hole of the valve seat to control the operation of air inlet and air outlet.

DETAILED DESCRIPTION OF THE PREFERRED EMBODIMENTS

Figure 1:
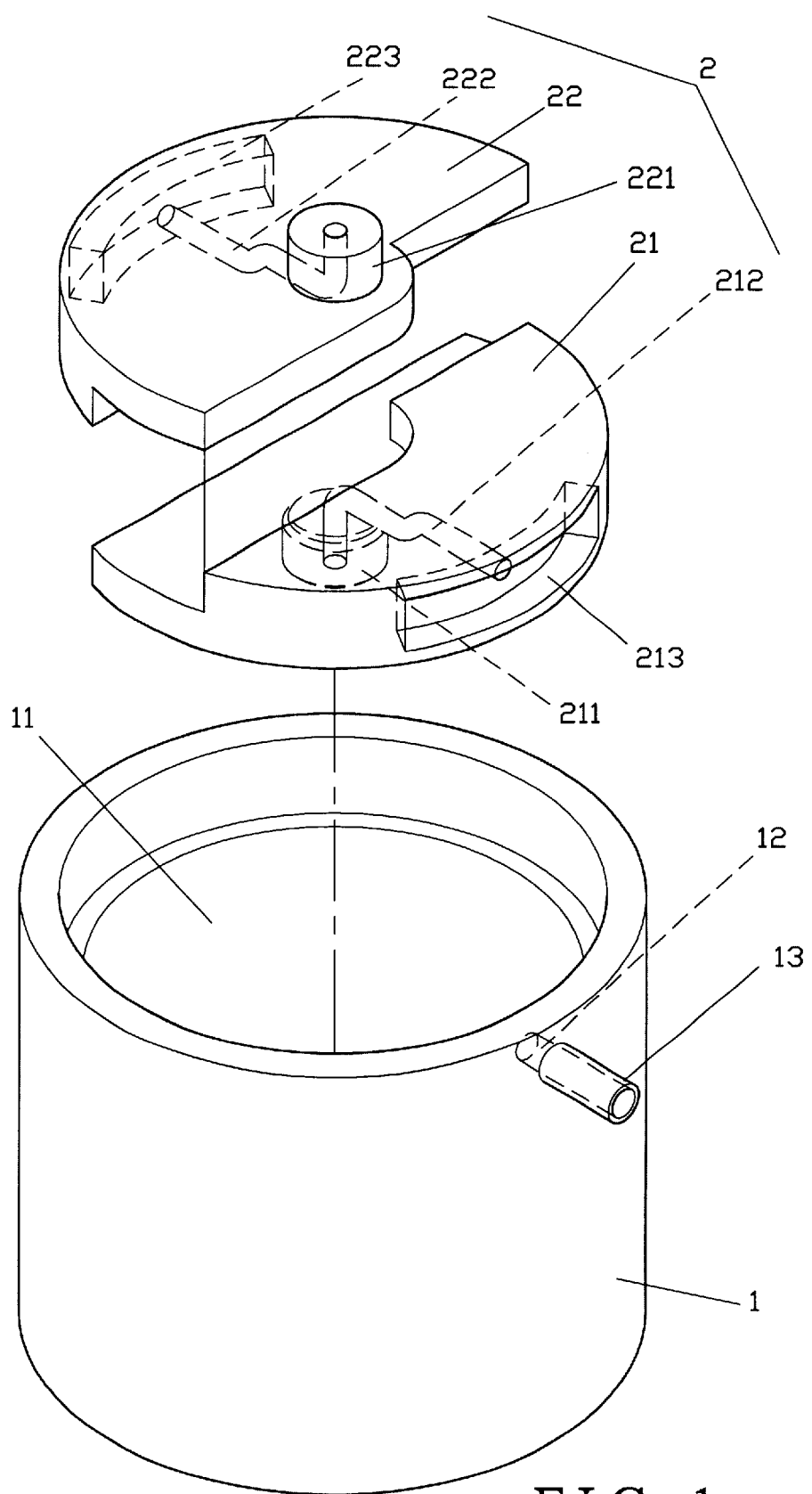
FIG. 1 is an exploded view showing the structure of a preferred embodiment of the present invention.

Referring to FIG. 1, a preferred embodiment of the present invention includes a valve seat (1) containing a circular valve block (2) composed of two abutted semicircular blocks (21), (22) that rotate relatively to the valve seat (1).

An accommodation space (11) is formed in the valve seat (1) and a hole (12) penetrating from the periphery of the valve (1) into the accommodation space (11). A tube (13) extends from the outer end of the hole (12) to connect a conduit. If multiples of the holes (12) are provided, multiple units of the conduits may be provided accordingly to be adapted to systems connected in parallel.

In the circular valve block (2), two axial plungers (211, 221) are respectively formed at the centers of the upper and the lower sides of the two semicircular blocks (21), (22), and air inlet and outlet passages (212, 222) extending from the periphery of the valve block (2) into the axial plungers (211, 221) are respectively formed inside the two semicircular blocks (21, 22). Two troughs (213, 223) in a proper arc length are each provided on the periphery of the two semicircular blocks (21, 22) in relation to their corresponding passages (212, 222). Air or liquid then flows through the troughs (213, 223) and the passages (212, 222) in relation to the hole (12) penetrating from the interior of the valve seat (1) to its periphery, and each of the periphery of the semicircular blocks (21, 22) tightly adhered to the inner wall of the valve seat (1) to prevent leakage.

Figure 2:
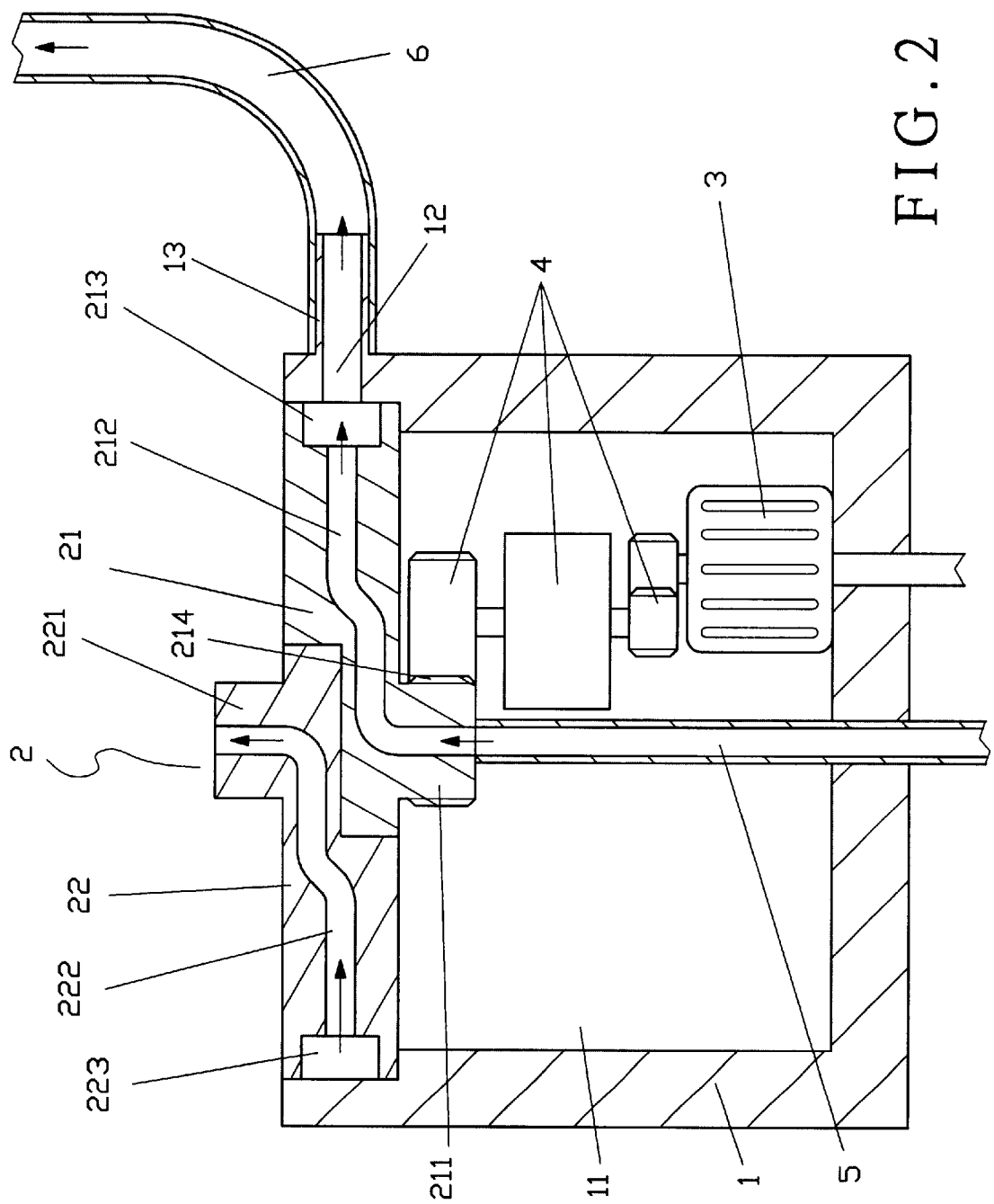
FIG. 2 is a schematic view showing an assembly of the preferred embodiment of the present invention.

Now referring to FIG. 2, both of the semicircular blocks (21, 22) are abutted to form the circular valve block (2) inserted inside the valve seat (1). The circular valve block (2) rotates and moves in relation to the valve seat (1). One of feasible means to keep driving the circular valve block (2) to rotate and gear a gear (214) to the axial plunger (211) located at the center of the lower side of the semicircular block (21), and a motor (3) provided inside the accommodation space (11) of the valve seat (1). It is to be noted that the motor (3) takes advantage of the air compressor in the oxygen generator as mentioned in the aforesaid prior art to drive the motor for pumping the air. The motor (3) is provided with double output shafts with one end geared through a transmission gear (4) to the gear (214) of the axial plunger (211) in the semicircular block (21) to drive the circular valve block (2) to rotate while the other end extending out of the valve seat (1) to drive the air pump, or to other power mechanism provided with the rotary valve of the present invention if not applied to an oxygen generator.

Figure 3:
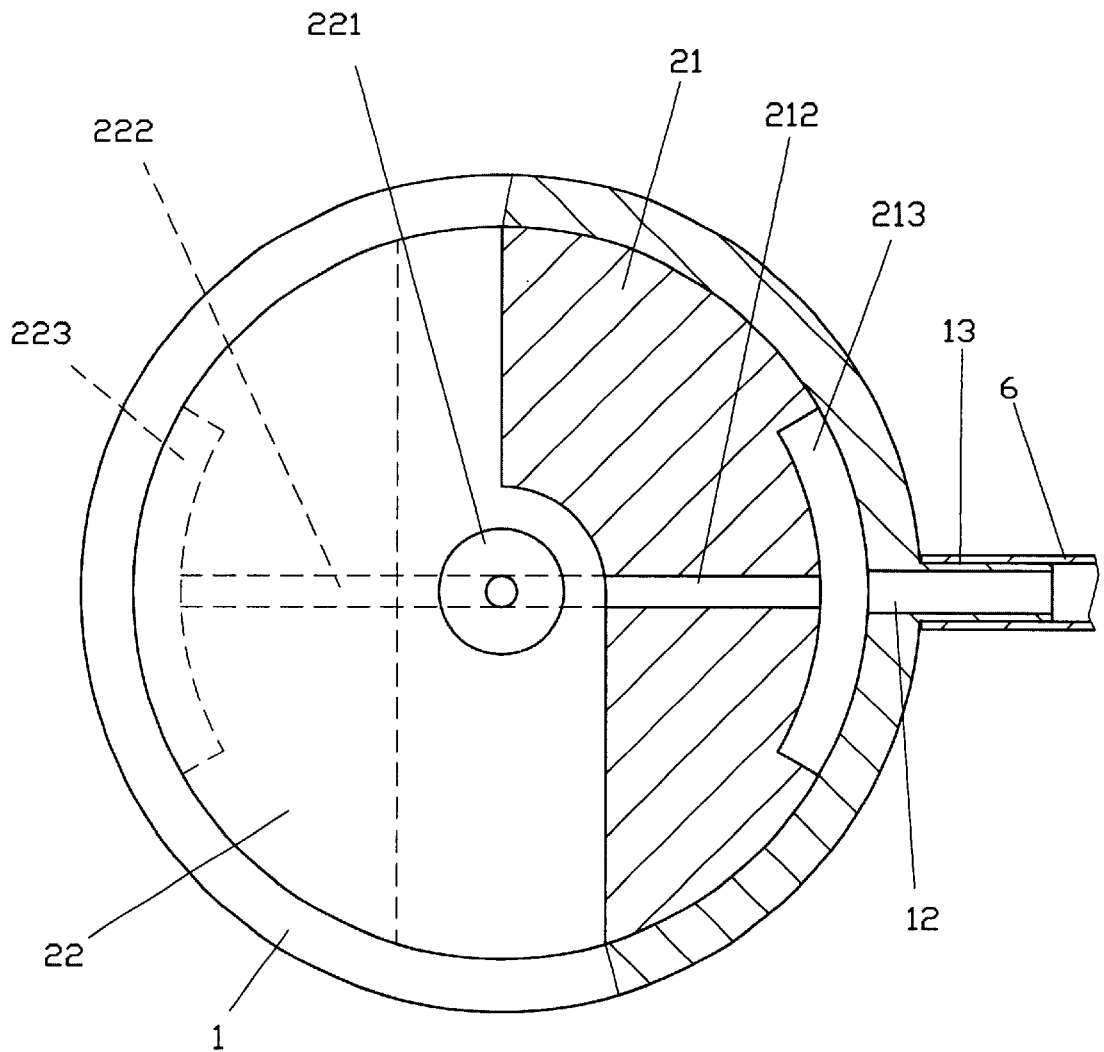
FIG. 3 is a view showing the air inlet status of the preferred embodiment of the present invention.
Figure 4:
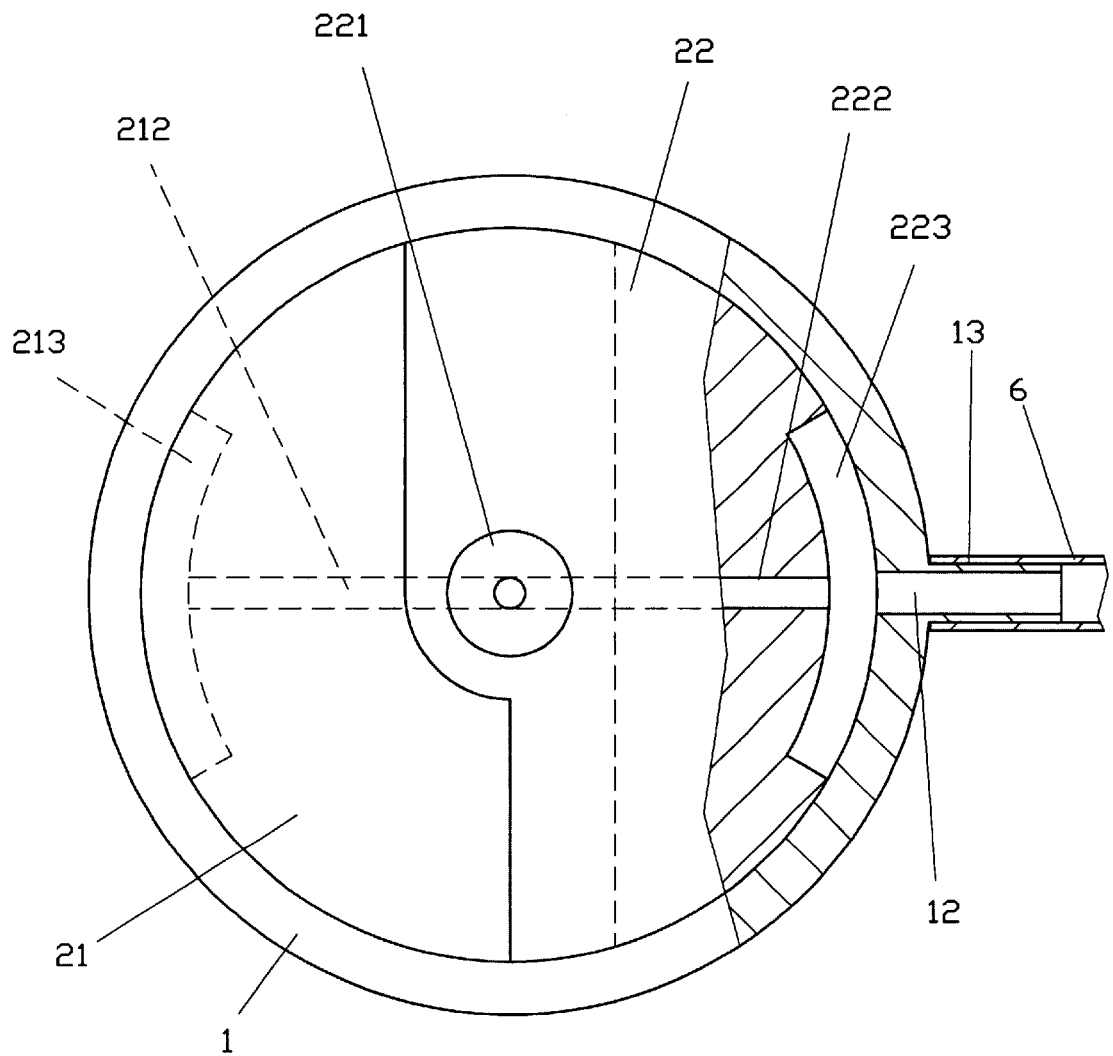
FIG. 4 is a view showing the air release status of the preferred embodiment of the present invention.

During the travel of the circular valve block (2) rotating inside the valve seat (1), the semicircular block (2f) is abutted with the trough (213) at an opening of the air inlet passage (212) to the hole (12) of the valve seat (1). The other end of the inlet passage (212) connects to an air inlet conduit (5) at an opening of the axial plunger (211) as illustrated in FIG. 3 to introduce the air. The air then passes through the air inlet passage (212), the trough (213) and is guided to a related device through the hole (12) of the valve seat (1) and a conduit (6) connected to the tube (13). Furthermore, as illustrated in FIG. 4, during the air exhaust, the semicircular block (22) is abutted with the trough (223) at an opening of the air outlet passage (222) to the hole (12) of the valve seat (1). The hole (12) then has the air released from the related device to be guided into the valve through the conduit (6)

connected through the tube (13). Therefore, the air is exhausted from the axial plunger (221) through the air outlet passage (222). With such configuration, the air inlet and outlet passages (212, 222) of the respective semicircular blocks (21, 22) are connected in relation to the hole (12) of the valve seat (1) to circulate the air (or liquid) at a specific timing, thus to control the air inlet and air exhaustion.

Furthermore, if the circular valve block (2) is not required to be driven for continuous rotation to repeat the air circulation, then the motor (3) may not be provided, so that the circular valve block (2) is rotated by manual to change the connection configuration of those air inlet and outlet passages.

Figure 5:
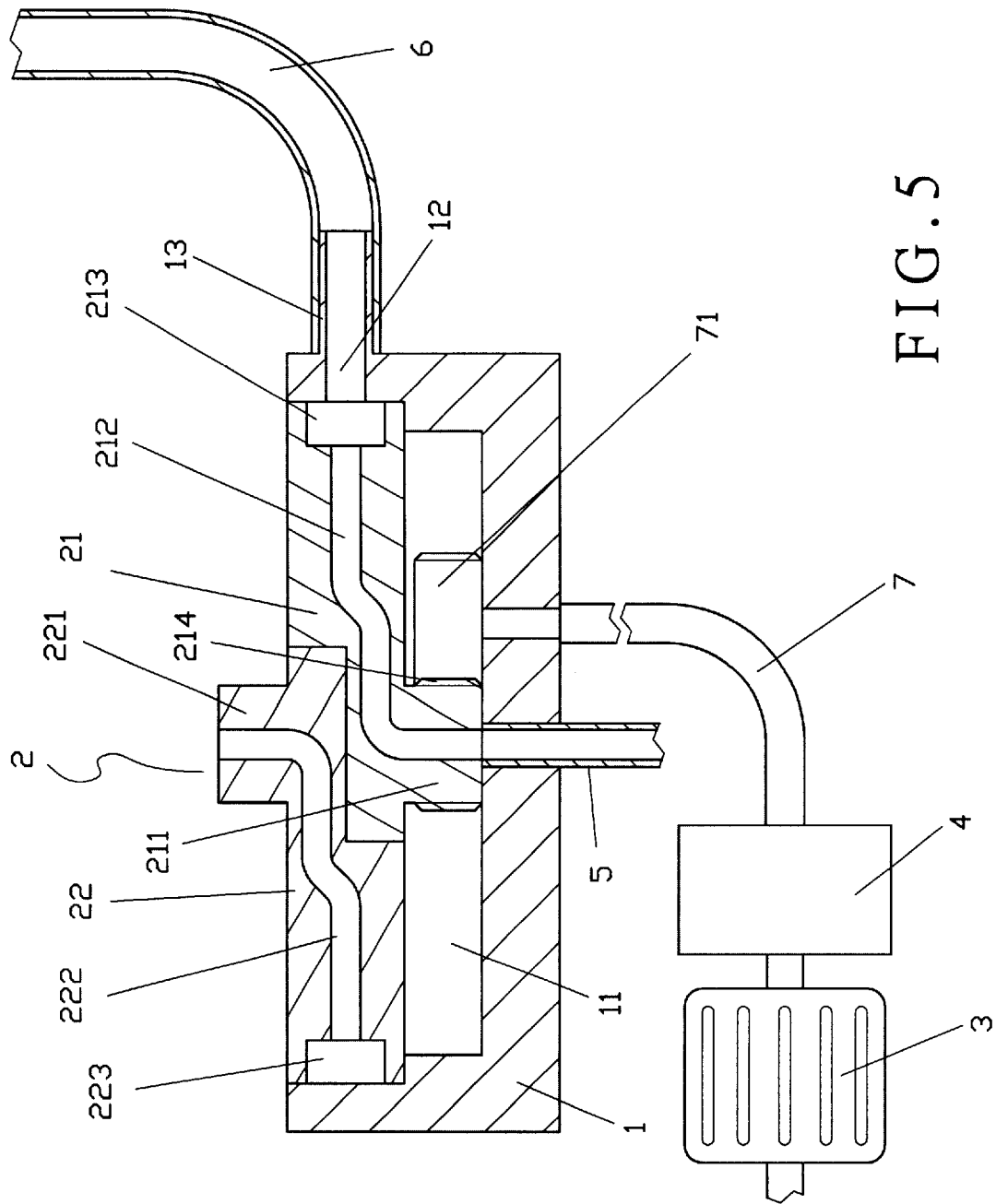
FIG. 5 is a schematic view showing an assembly of another preferred embodiment of the present invention.

The preferred embodiment described above has the motor (3) provided in the accommodation space (11) of the valve seat (1) and with one end of an output shaft geared through the transmission gear (4) to the gear (214) of the axial plunger (211) from the semicircular block (21) to drive the circular valve block (2) to move and rotate. However, in another preferred embodiment of the present invention, both of the motor (3) and the transmission gear (4) are provide outside the valve seat (1) as illustrated in FIG. 5. As a result, the accommodation space (11) of valve seat (1) can be reduced, and both externally connected motor (3) and transmission gear (4) may be further connected to a linkage (7) of a general flexible shaft product while a gear (71) connected to its end may extend into the reduced accommodation space (11) of the valve seat (1) so to be geared to the gear (214) of the axial plunger (211) of the semicircular block (21). Consequently, the power from the motor (3) is transmitted the same to drive the circular valve block (2) to rotate.

As disclosed, the present invention by providing a rotary valve that has a common air inlet and outlet passage on the same valve block and allowing changes of the configuration of the connected air inlet and outlet passages by means of a rotating circular valve block to control air circulation is innovative in general, means of practice and operation model with a structural configuration different from that of the prior art.

I claim:

1. A rotary valve comprising a valve seat containing a pair of abutted semicircular blocks that rotate in relation to said valve seat characterized by that:

an accommodation space being formed in said valve seat and a hole penetrating into the interior of said accommodation space being provided in said valve seat; an axial plunger being each formed at the centers of the upper and the lower sides of said two semicircular blocks; an air inlet and outlet passage being each formed in the two semicircular blocks, a trough being each provided on the periphery of said two semicircular blocks in relation to an opening of the relative passage; said two troughs being connected through said air inlet and outlet passages for air to flow through in relation to said hole from within said valve seat to its periphery.

* * * * *